(12) United States Patent
Bouillon et al.

(10) Patent No.: US 9,440,888 B2
(45) Date of Patent: Sep. 13, 2016

(54) METHOD OF FABRICATING A PART OUT OF CMC MATERIAL

(71) Applicant: HERAKLES, Le Haillan (FR)

(72) Inventors: Eric Bouillon, Le Haillan (FR); Eric Philippe, Merignac (FR); Andre Lafond, Saint Medard en Jalles (FR); Franck Lamouroux, Le Taillan Medoc (FR)

(73) Assignee: HERAKLES, Le Haillan (FR)

( * ) Notice: Subject to any disclaimer, the term of this patent is extended or adjusted under 35 U.S.C. 154(b) by 322 days.

(21) Appl. No.: 14/361,854

(22) PCT Filed: Nov. 22, 2012

(86) PCT No.: PCT/FR2012/052700
§ 371 (c)(1),
(2) Date: May 30, 2014

(87) PCT Pub. No.: WO2013/079853
PCT Pub. Date: Jun. 6, 2013

(65) Prior Publication Data
US 2015/0008613 A1 Jan. 8, 2015

(30) Foreign Application Priority Data

Nov. 30, 2011 (FR) ..................................... 11 60941

(51) Int. Cl.
*B28B 11/00* (2006.01)
*C04B 41/85* (2006.01)
(Continued)

(52) U.S. Cl.
CPC ............. *C04B 41/85* (2013.01); *C04B 35/573* (2013.01); *C04B 35/62873* (2013.01); *C04B 35/806* (2013.01); *C04B 41/009* (2013.01); *C04B 41/5024* (2013.01); *C04B 2235/422* (2013.01); *C04B 2235/428* (2013.01); *C04B 2235/5248* (2013.01); *C04B 2235/5252* (2013.01);
(Continued)

(58) Field of Classification Search
None
See application file for complete search history.

(56) References Cited

U.S. PATENT DOCUMENTS 4,889,686 A 12/1989 Singh et al.
4,944,904 A 7/1990 Singh et al.
(Continued)

FOREIGN PATENT DOCUMENTS

EP 0835853 A1 4/1998
EP 2210868 A2 7/2010
(Continued)

OTHER PUBLICATIONS

International Search Report for corresponding International PCT Application No. PCT/FR2012/052700, mailed Feb. 18, 2013.

*Primary Examiner* — Stella Yi
(74) *Attorney, Agent, or Firm* — Workman Nydegger

(57) ABSTRACT

Fabricating a composite material part comprises the steps of making a consolidated fiber preform, the fibers of the preform being carbon or ceramic fibers that are coated in an interphase formed by at least one layer of pyrolytic carbon (PyC) or of boron-doped carbon (BC). Obtaining a partially densified consolidated fiber preform, where partial densification comprises forming a first matrix phase on the interphase, the first matrix phase comprising a plurality of layers of self-healing material alternating with one or more layers of PyC or of BC. Continuing densification by dispersing carbon and/or ceramic powder within the partially densified consolidated preform and by infiltrating molten silicon or a liquid composition formed for the most part of silicon.

13 Claims, 1 Drawing Sheet

(51) Int. Cl.
    *C04B 35/573*     (2006.01)
    *C04B 35/628*     (2006.01)
    *C04B 35/80*     (2006.01)
    *C04B 41/00*     (2006.01)
    *C04B 41/50*     (2006.01)

(52) U.S. Cl.
    CPC .... *C04B2235/614* (2013.01); *C04B 2235/616* (2013.01); *C04B 2235/72* (2013.01); *C04B 2237/00* (2013.01); *F05D 2300/6033* (2013.01)

(56) References Cited

U.S. PATENT DOCUMENTS

| | | |
|---|---|---|
| 5,015,540 A | 5/1991 | Borom et al. |
| 5,246,736 A | 9/1993 | Goujard et al. |
| 5,965,266 A | 10/1999 | Goujard et al. |
| 6,068,930 A | 5/2000 | Lamouroux et al. |
| 6,221,475 B1 | 4/2001 | Domergue et al. |
| 8,607,454 B2 | 12/2013 | Blanchard et al. |
| 2009/0169873 A1 | 7/2009 | Louchet-Pouillerie et al. |
| 2010/0003504 A1 | 1/2010 | Louchet-Pouillerie et al. |
| 2010/0015428 A1 | 1/2010 | Philippe et al. |
| 2010/0179045 A1 | 7/2010 | Fry et al. |
| 2011/0256411 A1 | 10/2011 | Courcot et al. |
| 2011/0311368 A1 | 12/2011 | Coupe et al. |
| 2012/0055609 A1 | 3/2012 | Blanchard et al. |
| 2013/0089429 A1 | 4/2013 | Nunez et al. |

FOREIGN PATENT DOCUMENTS

| | | |
|---|---|---|
| FR | 2939129 A1 | 6/2010 |
| WO | 2010066140 A1 | 6/2010 |
| WO | 2010072978 A1 | 7/2010 |
| WO | 2010116066 A1 | 10/2010 |
| WO | 2011080443 A1 | 7/2011 |

METHOD OF FABRICATING A PART OUT OF CMC MATERIAL

BACKGROUND OF THE INVENTION

The invention relates to making parts out of composite material having a matrix that is ceramic or at least partially ceramic, and referred to below as a CMC material.

The field of application of the invention is making parts that are to be exposed in operation to high temperatures in an oxidizing atmosphere, and in particular in the fields of aviation and space, specifically parts for the hot portions of aviation turbine engines, it being understood that the invention may be applied in other fields, for example in the field of industrial gas turbines.

CMC materials possess good thermostructural properties, i.e. strong mechanical properties that make them suitable for constituting structural parts, together with the ability to conserve those properties at high temperatures.

The use of CMC materials instead of metal materials for parts that are exposed in operation to high temperatures has therefore been recommended, particularly since CMC materials present density that is substantially smaller than that of the metal materials they replace.

A well-known method of fabricating parts out of CMC material comprises making a fiber preform from a woven fiber texture, the preform being consolidated and densified by a ceramic matrix by chemical vapor infiltration (CVI). By way of example, reference may be made to Documents WO 2010/066140, WO 2010/116066, and WO 2011/080443, which relate to fabricating parts for aviation turbine engines out of CMC material.

A second well-known method consists in making a preform from fiber plies in which silicon carbide based fibers are coated by CVI in a layer of boron nitride BN covered in a layer of carbon or carbide, and in particular a layer of silicon carbide SiC. The fiber plies are preimpregnated with a composition containing a carbon powder or ceramic powder and an organic binder, or in a variant they are impregnated with such a composition after the preform has been formed. Once the binder has been eliminated, densification is performed by infiltrating molten silicon, possibly enriched with boron, where such a densification process is known as a melt infiltration (MI) process. By way of example, reference may be made to Documents U.S. Pat. No. 4,889,686, U.S. Pat. No. 4,944,904, or U.S. Pat. No. 5,015,540. In well-known manner, the BN interphase material coating the fibers performs an embrittlement-relief function in the composite material, while isolating the fibers from the molten silicon during the MI process.

The CVI densification process enables matrix phases to be obtained that are of uniform thickness and of controlled composition, in particular matrix phases made of materials having specific functions of diverting cracks or of being self-healing, thereby imparting long lifetime at high temperatures and under an oxidizing atmosphere. The term "self-healing" is used herein to designate a material that, in the presence of oxygen, forms a vitreous composition that is capable of passing to the pasty or fluid state in certain temperature ranges, thereby sealing cracks that appear within the material. Examples of self-healing materials are an Si—B—C ternary system or a boron carbide system capable of forming a borosilicate type glass. Nevertheless, CVI densification processes are relatively lengthy and expensive.

Conversely, densification by an MI process does not enable matrix phases to be formed with controlled thickness and composition, however it is much faster and easier to perform than CVI densification, and from this point of view it can be attractive. Nevertheless, in the presence of cracking, parts obtained by the second above-mentioned method present a lifetime that is short in an oxidizing atmosphere as from temperatures of about 800° C., because the BN material of the interphase coating oxidizes into $B_2O_3$ which, in the presence of moisture, forms a volatile oxide leading to BN material depletion, and thus to the embrittlement-relief function disappearing progressively. Unfortunately, it is practically inevitable that CMC materials will be subjected to cracking because of the thermal cycling to which they are subjected in operation. Furthermore, forming BN by CVI is complex and makes use of precursor gases of the $NH_3$ and $BCl_3$ or $BF_3$ type, thus requiring an installation that is complex, in particular in order to process effluents on an industrial scale. Furthermore, depositing a layer of SiC on the BN material of the interphase coating can be of limited effectiveness in protecting the coating while molten silicon is being infiltrated, since an SiC deposit obtained by CVI generally presents a columnar structure into which the molten silicon can become infiltrated.

OBJECT AND SUMMARY OF THE INVENTION

A particular object of the invention is to provide a method that does not have the drawbacks of the above-mentioned known methods.

This object is achieved by a method of fabricating a composite material part, the method comprising the steps of:
making a fiber structure, the fibers of the fiber structure being carbon or ceramic fibers;
forming an interphase coating on the fibers, the coating being formed by at least one layer of pyrolytic carbon (PyC) or of boron-doped carbon (BC);
shaping the fiber structure by means of shaping tooling in order to obtain a preform of the part that is to be fabricated;
consolidating the fiber preform in the shaping tooling;
forming a first matrix phase on the interphase, the first matrix phase comprising a plurality of layers of self-healing material alternating with one or more layers of material selected from pyrolytic carbon (PyC) and boron-doped carbon (BC), the layers of self-healing material and the layers of PyC or BC being obtained by CVI in order to obtain a partially densified consolidated preform; and
after removing the preform from the shaping tooling, continuing densification by dispersing carbon powder and/or ceramic powder within the partially densified consolidated preform and by infiltrating molten silicon or a liquid composition formed for the most part of silicon.

In this example, the PyC or BC interphase has a conventional function of embrittlement relief for the composite material resulting from the sheet structure of PyC or BC that enhances the deflection of cracks reaching the interphase after propagating in the matrix, thereby preventing or slowing down breakage of fibers by such cracks.

For boron-doped carbon, or BC, this means a composition containing 5 at % B to 20 at % B, the balance being carbon. Such a composition presents a turbostratic structure, i.e. the stacked sheets not stacked in alignment, thereby enhancing the embrittlement-relief function, where it is difficult to obtain such a structure with BN.

The method of the invention is remarkable in particular in that it provides for making a sequenced matrix phase with layers of self-healing material alternating with one or more layers of PyC or BC crack deflector material, the sequenced matrix phase being interposed between the interphase coating and the matrix phase that is obtained by the MI process.

The matrix phase obtained by the MI process is subjected to cracking in a manner similar to a monolithic ceramic, while the sequenced matrix phase containing the self-healing material and the crack deflector material is effective in opposing the propagation of cracks as far as the interphase coating, and is thus effective in opposing exposure of the interphase coating to an oxidizing environment. The embrittlement-relief function provided by the interphase coating is thus preserved in spite of the oxidizable nature of the PyC or BC interphase coating. There is no need to form a BN interphase coating, with the above-mentioned difficulties that involves, while the ability to withstand an oxidizing atmosphere at high temperature, in particular at temperatures higher than 800° C., is ensured by the presence of the sequenced matrix phase. In addition, the sequenced matrix phase also contributes to protecting the interphase coating from the molten silicon or from the silicon-based liquid composition during the MI process.

Advantageously, the material of each layer of self-healing material in the first matrix phase may be selected from an Si—B—C ternary system and boron carbide, and is preferably an amorphous material.

The total thickness of all of the layers of self-healing material plus the layer(s) of PyC or BC in the first matrix phase may be in the range 500 nanometers (nm) to 30 micrometers (μm).

In an implementation of the method, the first matrix phase is finished off with a layer of ceramic material that does not contain boron, which layer is formed on the last layer of self-healing material.

Said layer of ceramic material that does not contain boron may have thickness of at least 500 nm.

Said layer of ceramic material that does not contain boron may in particular be made of silicon carbide (SiC) or of silicon nitride ($Si_3N_4$).

In an implementation, making the consolidated fiber preform comprises forming the fiber preform by shaping the fiber structure and forming the interphase coating on the fibers of the preform by chemical vapor infiltration, and then forming the first matrix phase, the interphase coating and the first matrix phase being formed to have a total thickness that is sufficient for consolidating the preform. By way of example, such thickness that is sufficient for consolidating the preform is not less than 500 nm.

In another implementation, forming the interphase on the fibers of the preform comprises a first step of forming a first interphase layer and a second step of forming a second interphase layer, the first and second steps being separated by a step of consolidating the fiber preform, consolidation of the preform comprising impregnation with a liquid composition containing a carbon or ceramic precursor resin, shaping the preform in shaping tooling, polymerizing the resin, and transforming the resin into carbon or ceramic, the preform being kept in shape in the shaping tooling at least until the resin has been polymerized.

The first interphase layer may be formed by chemical vapor infiltration to have a thickness of no more than 300 nm.

In an implementation, the fiber preform is formed from a fiber structure made as a single piece by three-dimensional or multilayer weaving.

Carbon and/or ceramic powder may be dispersed within the consolidated fiber preform by impregnation with an aqueous slip containing the powder in suspension in water.

The dispersion of carbon and/or ceramic powder within the consolidated fiber preform may also be performed by means of a liquid composition containing the carbon and/or ceramic powder dispersed in a carbon or ceramic precursor resin.

The liquid composition formed for the most part of silicon may also contain at least one element selected from boron B, titanium Ti, and molybdenum Mo.

BRIEF DESCRIPTION OF THE DRAWINGS

The invention can be better understood on reading the following description given by way of non-limiting indication with reference to the accompanying drawings, in which.

DETAILED DESCRIPTION OF IMPLEMENTATIONS

Figure 1:
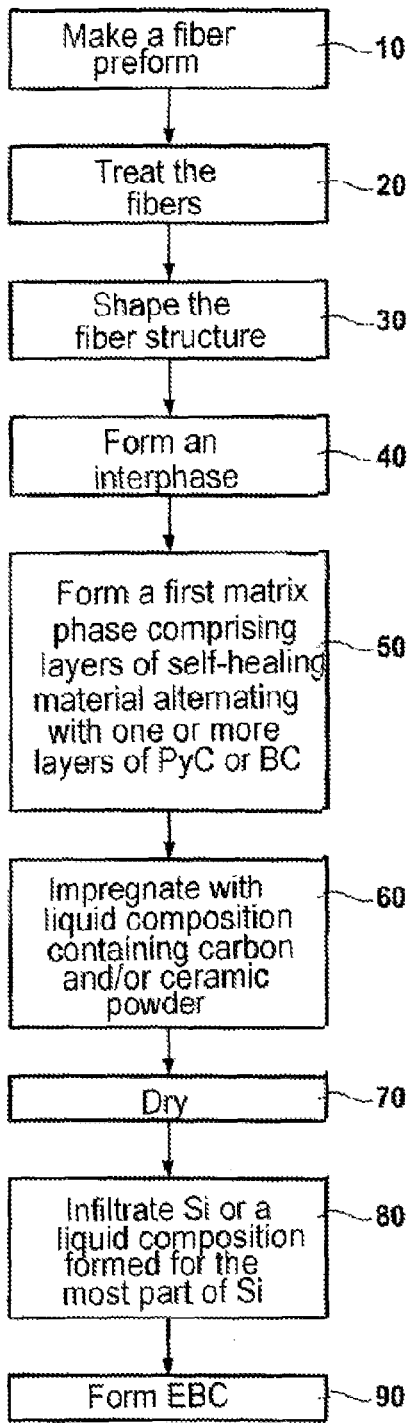
FIG. 1 shows successive steps in a method of fabricating a part out of CMC material in a first implementation of the invention.

A first implementation of the invention is described with reference to FIG. 1.

A first step 10 consists in making a fiber structure from which a fiber preform is made having a shape close to the shape of the part that is to be fabricated. Such a fiber structure may be obtained by multilayer or three-dimensional weaving of yarns or tows. It is also possible to start from two-dimensional fiber textures such as woven fabric or sheets of yarns or tows in order to form plies that are then draped on a shape and possibly bonded together, e.g. by stitching or by implanting yarns.

The fibers constituting the fiber structure are preferably ceramic fibers, e.g. fibers made essentially of silicon carbide SiC (referred to below as SiC fibers), or of silicon nitride $Si_3N_4$. In particular, it is possible to use the SiC fibers sold under the name "Hi-Nicalon(S)" by the Japanese supplier Nippon Carbon. In a variant it is possible to use carbon fibers.

In known manner, with ceramic fibers, and in particular SiC fibers, it is preferable to perform surface treatment (step 20) on the fibers before forming an interphase coating in order to eliminate sizing and a superficial oxide layer such as silica $SiO_2$ present on the fibers.

A step 30 consists in shaping the fiber structure by means of shaping tooling in order to obtain a preform having a shape close to the shape of the part that is to be fabricated.

With the preform held in its shaping tooling, e.g. made of graphite, an embrittlement-relief interphase is made by CVI on the fibers of the preform, this interphase being formed by at least one layer of pyrolytic carbon or PyC or of boron-doped carbon or BC (with 5 at % B to 20 at % B, the balance being C) (step 40). The thickness of the PyC or BC interphase preferably lies in the range one nanometer to a few tens of nanometers, e.g. in the range 10 nm to 1000 nm.

Thereafter (step 50), a first matrix phase is formed comprising a plurality of layers of self-healing material obtained by CVI alternating with one or more layers of PyC or BC obtained by CVI, the first and last layers of the first matrix phase being made of self-healing material. For each layer of self-healing material, it is possible to select a material containing boron, e.g. an amorphous ternary Si—B—C system or containing boron carbide, preferably amorphous boron carbide, that is capable, in the presence of oxygen, of forming a borosilicate type glass having self-healing properties. The total thickness of the layers of self-healing material plus the layer(s) of PyC or of BC is several hundreds of nanometers, preferably lying in the range 500 nm to 30 μm. The self-healing materials of the various layers of self-healing material may be the same or they may be different.

The first matrix phase may be finished off by a layer of ceramic material that does not contain boron, e.g. SiC or $Si_3N_4$, formed on the last layer of self-healing material in order to constitute a barrier against reaction between the self-healing material and the molten silicon or the silicon-based liquid composition that is introduced subsequently. The thickness of this layer of ceramic material forming a reaction barrier is preferably several hundreds of nanometers, e.g. not less than 500 nm, typically lying in the range one micrometer to several micrometers. Ceramic materials not containing boron and other than SiC or $Si_3N_4$ may be used to form the reaction barrier, for example refractory carbides such as ZrC or HfC.

The total thickness of the interphase plus the first matrix phase including an optional ceramic layer forming a reaction barrier is selected to be sufficient to consolidate the fiber preform, i.e. to bond the fibers of the preform together sufficiently to enable the preform to be manipulated while conserving its shape without the assistance of support tooling. This total thickness is preferably at least 500 nm. After consolidation, the preform remains porous, since only a minority fraction of its initial pores is filled in with the interphase and the first matrix phase, for example.

PyC, BC, $B_4C$, Si—B—C, or SiC can be deposited in well-known manner by CVI. Reference may be made in particular to Documents U.S. Pat. No. 5,246,736, U.S. Pat. No. 5,965,266, and U.S. Pat. No. 6,068,930.

It should be observed that the step of forming the interphase by CVI may be performed on fibers of the fiber structure before the structure is shaped providing as the interphase is sufficiently thin not to affect the desired capacity of the fiber structure for deformation.

The consolidated, partially densified, and still porous preform is removed from its shaping tooling in order to continue densification by means of an MI type process comprising introducing solid fillers and infiltrating molten metal.

The consolidated preform is impregnated with a liquid composition containing a carbon and/or ceramic powder (step 60).

The impregnation composition may be a slip comprising the powder in suspension in a liquid vehicle, e.g. water. The powder may be retained in the preform by filtering or possibly by settling with the help of suction. The powder is constituted by carbon and/or a ceramic, in particular by a carbide, a nitride, or a silicide, e.g. silicon carbide SiC. It is preferable to use a powder made up of particles having a mean size of less than 5 μm.

After drying (step 70), a consolidated preform is obtained with a carbon and/or ceramic powder dispersed in its pores.

It is also possible to impregnate the consolidated preform with a liquid composition containing the carbon and/or ceramic powder dispersed in an organic resin of the carbon resin type or a ceramic precursor resin, e.g. an organosilicate resin, possibly with solvent added to the resin. Impregnation may be performed using a known method of the infusion, injection, or resin transfer molding (RTM) type. After the resin has polymerized, pyrolysis heat treatment is performed to transform the resin into carbon or ceramic residue.

Densification is continued (step 80) by infiltrating molten silicon Si or a liquid composition containing a majority of molten silicon, with additional elements, possibly being selected from boron B, titanium Ti, and molybdenum Mo. Infiltration is performed under a non-oxidizing atmosphere, preferably under reduced pressure.

When the previously introduced powder is made of carbon, and when a carbon residue is present from a resin used for impregnating the consolidated preform, the silicon reacts therewith in order to form silicon carbide SiC. When the previously introduced powder is a ceramic powder, in particular a carbide, a nitride, or a silicide, and when a ceramic residue of a resin used for impregnating the consolidated preform is present, then a matrix is obtained that is made partially of silicon bonding with the ceramic powder. In any event, the total matrix as finally obtained is at least partially made of ceramic, and preferably mostly made of ceramic.

The resulting part may be provided with an environmental barrier coating (EBC) in known manner (step 90). EBC compositions are well known, in particular those comprising an alumino-silicate layer of alkali or alkaline-earth elements, such as barium strontium aluminum silicate (BSAS). Reference may be made to the following documents amongst others: US 2009/169873, US 2010/003504, and WO 2010/072978.

Another implementation of a method of the invention is described below with reference to FIG. 2.

Figure 2:
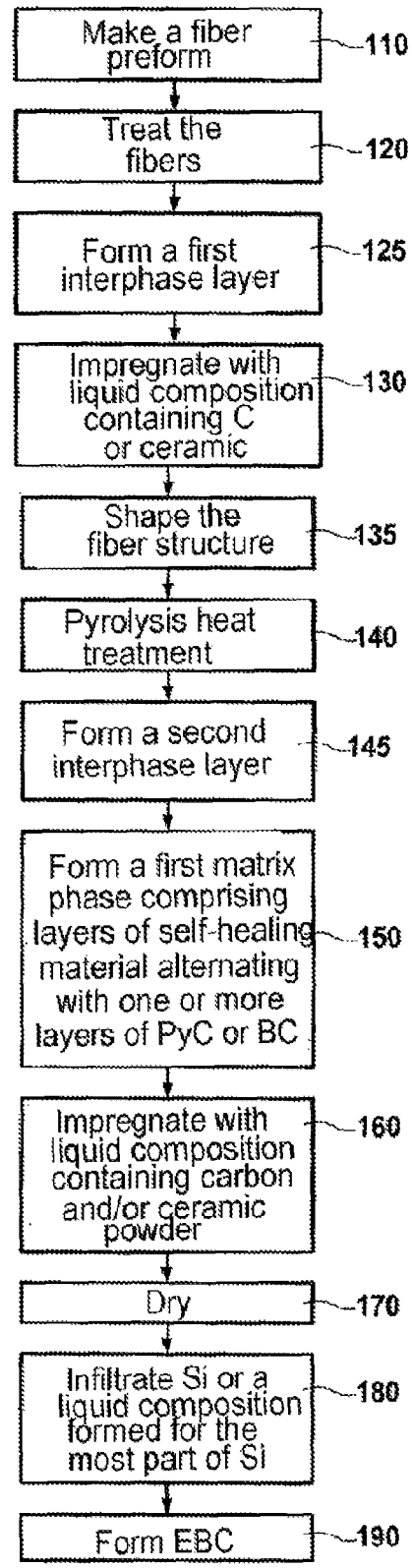
FIG. 2 shows successive steps in a method of fabricating a part out of CMC material in a second implementation of the invention.

The method of FIG. 2 differs from that of FIG. 1 in particular by the way in which the fiber preform is consolidated.

Steps 110 of making a fiber structure and 120 of treating the fiber structure if the fibers are ceramic fibers are similar to steps 10 and 20 of the method of FIG. 1.

A step 125 of using CVI to make a first interphase layer of PyC or of BC is performed after step 120 and before shaping the fiber structure. The thickness of the PyC or BC interphase layer is selected to be small enough to avoid affecting the capacity for deformation of the fiber structure, i.e. the thickness is no greater than 300 nm, for example.

Thereafter, consolidation is performed by a liquid technique. To this end, the fiber structure with the PyC or BC layer of the interphase coating is impregnated (step 130) by a liquid composition containing a carbon or ceramic precursor, and the fiber structure is shaped (step 135) in tooling in order to obtain a preform of desired shape. The carbon or ceramic precursor may be in the form of a resin, possibly diluted in a solvent. After eliminating the solvent, if any, and polymerizing the resin, heat treatment is performed (step 140) in order to obtain a consolidating solid phase of carbon or of ceramic in the form of pyrolysis residue grains. The fiber structure is maintained in the shaping tooling at least until the resin has polymerized. By way of example, a carbon precursor resin may be an epoxy, furanic, or phenolic resin, while a ceramic precursor resin may be a polysilane, polysiloxane, polysilazane, or silicone resin.

The fiber structure may equally well be impregnated with the liquid consolidation composition after the fiber structure has been shaped in tooling, with impregnation being performed by infusion, by injection, or by an RTM type process.

Thereafter, making of the interphase is continued by forming a second PyC or BC interphase layer (step 145) covering the first interphase layer and the discontinuous grains of the pyrolysis residue of the consolidation resin. The thickness of the second interphase layer may be at least 100 nm. Forming an interphase layer in two steps that are separated by a consolidation step using a liquid technique is described in Document US 2010/015428.

Thereafter, a first matrix phase is formed by CVI (step 150), step 150 being similar to step 50 of the method of FIG. 1. As described above, the first matrix phase is formed by a plurality of layers of self-healing material obtained by CVI alternating with one or more PyC or BC layers obtained by CVI. As mentioned above, the outer layer of self-healing material in the first matrix phase may be covered in a reaction barrier forming layer made of ceramic material that does not contain boron, e.g. SiC or $Si_3N_4$. The total thickness of the layers of self-healing material and the layer(s) of PyC or BC is several hundreds of nanometers, preferably not less than 500 nm, for example lying in the range 1 μm to 30 μm. The thickness of any ceramic layer forming a reaction barrier is preferably several hundreds of nanometers, e.g. not less than 500 nm, and typically lies in the range one micrometer to several micrometers.

The following steps of impregnation with an aqueous slip (step 160) or a liquid composition containing carbon or ceramic powder dispersed in a carbon or ceramic precursor resin, of drying (step 170), of infiltrating with molten silicon or with a liquid composition containing a majority of molten silicon (step 180), and of optionally forming an EBC (step 190) are similar to the steps 60, 70, 80, and 90 of the method of FIG. 1.

The invention claimed is:

1. A method of fabricating a part out of composite material having a matrix that is at least partially made of ceramic, the method comprising the steps of:
   making a fiber structure, the fibers of the fiber structure being carbon or ceramic fibers;
   forming an interphase coating on the fibers, the coating being formed by at least one layer of pyrolytic carbon (PyC) or of boron-doped carbon (BC);
   shaping the fiber structure by means of shaping tooling in order to obtain a fiber preform of the part that is to be fabricated;
   consolidating the fiber preform in the shaping tooling;
   forming a first matrix phase on the interphase, the first matrix phase comprising a plurality of layers of self-healing material alternating with one or more layers of material selected from pyrolytic carbon (PyC) and boron-doped carbon (BC), the plurality of layers of self-healing material and the one or more layers of PyC or BC being obtained by chemical vapor infiltration (CVI) in order to obtain a partially densified consolidated preform; and
   after removing the partially densified consolidated preform from the shaping tooling, continuing densification by dispersing carbon powder and/or ceramic powder within the partially densified consolidated preform and by infiltrating molten silicon or a liquid composition formed most of silicon.

2. The method according to claim 1, wherein the material of each layer of self-healing material in the first matrix phase is selected from an Si—B—C ternary system and boron carbide.

3. The method according to claim 1, wherein a total thickness of the plurality of layers of self-healing material plus the one or more layer(s) of PyC or BC in the first matrix phase lies in a range 500 nm to 30 μm.

4. The method according to claim 1, wherein the first matrix phase is finished off with at least one layer of ceramic material that does not contain boron, which layer is formed on a last layer of self-healing material.

5. The method according to claim 4, wherein said layer of ceramic material that does not contain boron has thickness of at least 500 nm.

6. The method according to claim 4, wherein said layer of ceramic material that does not contain boron is made of silicon carbide (SiC) or of silicon nitride (Si3N4).

7. The method according to claim 5, wherein said layer of ceramic material that does not contain boron is made of silicon carbide (SiC) or of silicon nitride (Si3N4).

8. The method according to claim 1, wherein making the consolidated fiber preform comprises forming the fiber preform by shaping the fiber structure and forming the interphase coating on the fibers of the fiber preform by chemical vapor infiltration, and then forming the first matrix phase, the interphase coating and the first matrix phase being formed to have a total thickness that is sufficient for consolidating the fiber preform.

9. The method according to claim 1, wherein forming the interphase on the fibers of the fiber preform comprises a first step of forming a first interphase layer and a second step of forming a second interphase layer, the first and second steps being separated by a step of consolidating the fiber preform, consolidation of the fiber preform comprising impregnation with a liquid composition containing a carbon or ceramic precursor resin, shaping the fiber preform in tooling, polymerizing the resin, and transforming the resin into carbon or ceramic, the fiber preform being kept in shape in the shaping tooling at least until the resin has been polymerized.

10. The method according to claim 1, wherein the fiber preform is formed from a fiber structure made as a single piece by three-dimensional or multilayer weaving.

11. The method according to claim 1, wherein the carbon and/or ceramic powder is dispersed within the consolidated fiber preform by impregnation with a slip containing the carbon and/or ceramic powder in suspension in a liquid vehicle.

12. The method according to claim 1, wherein the dispersion of carbon and/or ceramic powder within the consolidated fiber preform is performed by means of a liquid composition containing the carbon and/or ceramic powder dispersed in a carbon or ceramic precursor resin.

13. The method according to claim 1, wherein the liquid composition formed for the most part of silicon also contains at least one element selected from boron B, titanium Ti, and molybdenum Mo.

* * * * *